March 15, 1949. R. L. SNYDER, JR 2,464,420
STORAGE TYPE CATHODE-RAY TUBE
Filed Dec. 31, 1943
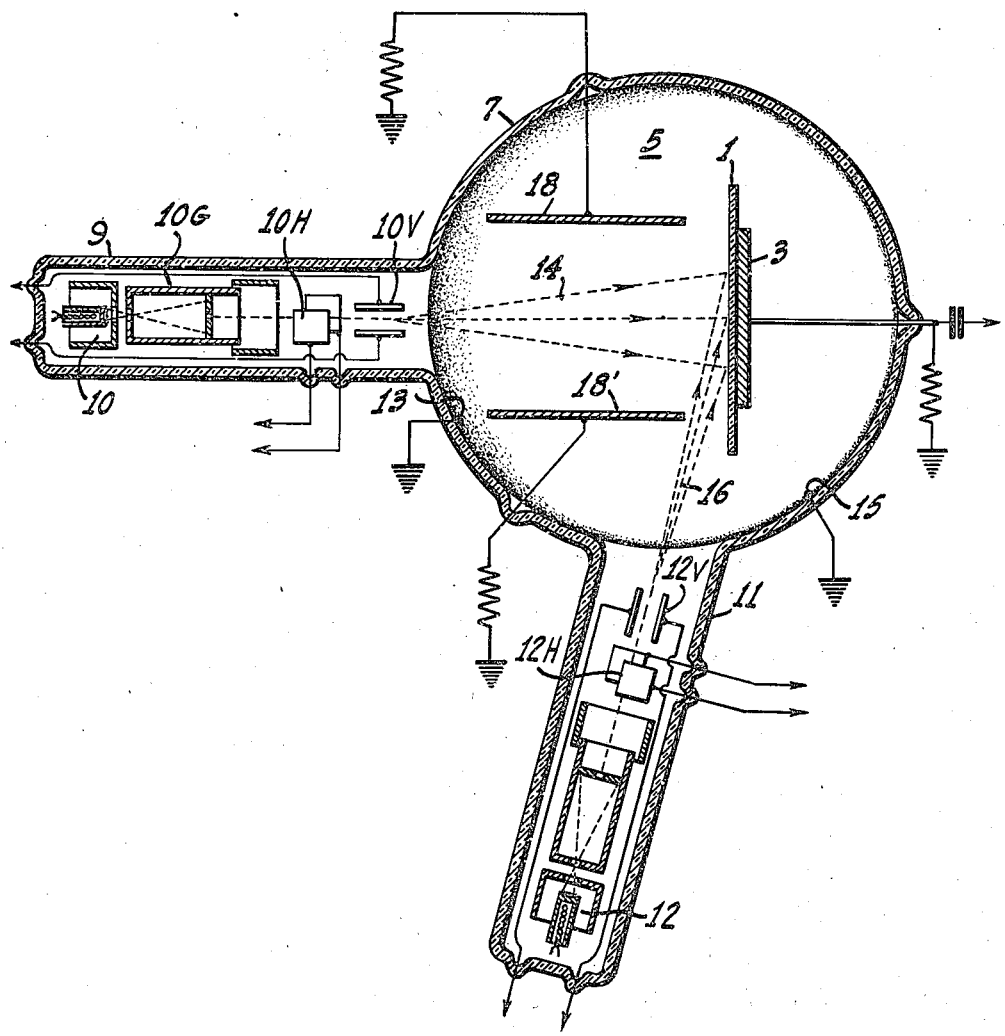
INVENTOR.
RICHARD L. SNYDER, JR
BY
ATTORNEY Patented Mar. 15, 1949

2,464,420

UNITED STATES PATENT OFFICE 2,464,420

STORAGE TYPE CATHODE-RAY TUBE

Richard L. Snyder, Jr., Princeton, N. J., assignor to Radio Corporation of America, a corporation of Delaware Application December 31, 1943, Serial No. 516,425

10 Claims. (Cl. 250—150)

This invention relates to electron discharge devices and particularly to improvements in plural-beam cathode ray tubes of the type suitable for "averaging-out" noise in radar and analogous systems for the communication of intelligence.

In the use of radar and similar equipment the received signals are often affected by static and other undesired extraneous electrical disturbances. Usually, radar and other "pulse" signal trains are identical over a large number of operating cycles and it has previously been proposed to employ a tube capable of storing a large number of these cycles in such a manner that the noise fluctuations (which are usually random in character) will integrate to some value close to zero, while the signals, which occur at regular intervals, are reinforced. When the stored cycles are reproduced, the various wanted parts of the signal coincide and produce considerable improvement in the signal-to-noise ratio.

Such noise reduction systems usually employ a plural-beam cathode ray tube for "averaging-out" the noise and these tubes may be provided with storage electrodes of various types. By way of example: the storage electrode may comprise a "two-sided mosaic," in which case the "put-on" and "take-off" beams are directed upon opposite sides of the screen (see British Patent 501,179). Another tube heretofore employed in such a noise reduction system employs a single-sided caesiated screen of special ("commutator type") laminated construction. In this case both beams may impinge upon the same side of the screen, preferably at different velocities (as to this see copending application, Serial No. 492,658, filed June 26, 1943). Alternatively, (as shown in application Serial No. 496,741, filed July 30, 1943, now U. S. Patent 2,416,914, issued March 4, 1947), the storage screen may comprise a multiplicity of spaced capacitor armatures upon which the signal is impressed by one beam, the second beam being arranged to scan the inter-armature space in a manner calculated to "take-off" the signal.

Irrespective of the advantages claimed for the plural-beam cathode ray tubes of the prior art, it may be said generally that the insulation and other problems incident to the construction and use of their "mosaic type," "commutator type" and "multi-capacitor type" signal-storage electrodes renders such tubes more complicated and expensive than is now necessary or desirable.

Accordingly, the principal object of the present invention is to provide an improved plural-beam cathode ray tube capable of "averaging-out" undesired components from the signal waves or pulses in radar, radio and analogous systems for the communication of intelligence, said tube being characterized by the simplicity and economy of its parts and by its trouble-free performance.

Other objects and advantages will be apparent and the invention itself will be best understood by reference to the following specification and to the accompanying partly diagrammatic sectional view of a plural-beam cathode ray tube embodying the invention.

As indicated in the drawing, the present invention contemplates and its practive provides a plural beam tube having a storage electrode constituted simply of a sheet 1 of mica or equivalent (i. e. opaque to electrons) insulating material and a conductive signal plate or film 3 which is mounted on or contiguous the back of the said insulating sheet. This storage electrode 1, 3, is mounted in the bulbous portion 5 of a highly evacuated tube or envelope 7. The tube 7 is provided with two dependent hollow neck portions 9 and 11, within which the electron guns 10 and 12, respectively, are separately mounted. These "guns" 10 and 12 may be of conventional construction and, in any event, are each provided either with a pair of horizontal and a pair of vertical deflecting plates 10H, 12H; 10V, 12V, respectively, or with magnetic deflecting means for imparting a scanning movement to the electron beams from the separate guns 10 and 12. As in standard practice, grounded metallic coatings 13 and 15 on the inner surface of the tube serve as the second anodes for the guns 10 and 12 respectively.

The electron axis of the gun 10 is arranged at an angle of substantially 90° with respect to the plane of the target surface of the mica sheet 1; thus its beam 14 strikes the said surface with normal incidence. The axis of the other gun 12 is off-set slightly less than 90° from the axis of the gun 10 and is thus disposed at an acute angle (of from, say, 1°, to say, 10°) with respect to the plane of the target. The beam 16 from the gun 12 bombards the same or a slightly larger area, of the target surface 1 as does the beam 14 from the gun 10, but with grazing incidence.

The bombarded side of the mica target 1 is shielded by a pair of spaced apart plates 18, 18' which are arranged in parallel relation on opposite sides of the path of the beam 14, and out of the path of the beam 16. These plates 18, 18' are thus so arranged that they control the electrostatic field on the gun side of the target; they also serve as collector electrodes for secondary electrons from the said target.

The relative potential distribution among the several electrodes is preferably (but not necessarily) as follows: gun cathodes—2000 volts, grid bias 9 to, say, 50 volts first anodes—1700 volts second anodes, collector plates (18, 18') and signal plate (3) at about ground potential.

In operating the device of the invention, the beam 14 is adjusted to such a high velocity that the ratio of the secondary electrons to the primary electrons is less than unity. The beam 16, which strikes the target with grazing incidence, has the same velocity as the beam 14 but because it is grazing, as is well known, the secondary emission ratio will be greater than unity. Therefore, the normal beam 14 will act to charge the surface of the mica negative with respect to the collectors 18, 18' because the number of secondary electrons leaving the surface of the mica will be less than the number of primary electrons bombarding it. The opposite condition exists in the region bombarded by the grazing electron beam 16. The grazing beam (16) carries sufficient current at all times to overcome the maximum negative charge that the normal beam 14 can put on the target.

In operation, the static affected signal-bearing waves are applied to the grid 10G of the gun 10 and modulate the beam 14 and the said beam is deflected horizontally with a linear sweep at the same frequency as that of the operating cycle of the radar or other equipment with which the tube 7 is associated. In addition, in order to spread the charged area on the target 1 for the dual purpose of storing more charge and enlarging the storage area, this beam (14) is deflected in the vertical direction by a high frequency voltage (which is applied to the vertical deflecting plates 10V in a well-known manner) well above any frequency which might be present in the signal. The grazing beam 16 is unmodulated but is preferably similarly spread or "fuzzed" so that its vertical displacement is the same or greater than that of the normal beam 14. The horizontal deflection of the grazing beam 16 is equal in amplitude and character to that of the normal beam 14 but is preferably very much lower in frequency. Under these conditions, the normal beam puts the signal on the storage electrode many times in the period of horizontal deflection of the grazing or "take-off" beam 16.

As mentioned above, the grazing beam 16 can always charge the mica surface 1 of the target to the collector potential. Thus, as the said beam 16 sweeps slowly over each portion of the target surface which has been charged by the normal beam 14, each of said portions is discharged and a displacement current flows in the circuit of the back-plate 3. This displacement current is a very low frequency facsimile of the original signal in which the noise or static is integrated or balanced out. The noise-free signal may then be amplified in the usual manner and viewed either with a cathode ray oscilloscope (not shown) having a long-persistent screen, or it may be otherwise recorded as on a facsimile machine (not shown).

It will be apparent from the foregoing that the present invention provides an improved plural beam cathode ray tube capable of "averaging-out" undesired components from the signal surface or pulses in radar, radio and analogous systems for the communication of intelligence and that said tube is characterized by the simplicity and economy of its parts and by its trouble-free performance.

It may also find application in instances wherein it is desirable to change the frequency of a radar signal. This need occurs when the outputs of a number of radar equipments situated in different locations must be correlated at a central station. Under these circumstances the high frequency radar signals are recorded at their normal speed and taken off the record at a much slower speed suitable for transmission over telephone lines.

I claim as my invention:

1. A storage electrode for a plural beam cathode ray tube, said storage electrode comprising a target consisting only of an insulating material which is opaque to electrons and a conductive backplate for said insulating target.

2. The invention as set forth in claim 1 and wherein said insulating material consists only of mica.

3. A storage device comprising an evacuated envelope containing a storage electrode consisting only of an insulating surface which is opaque to electrons and a conductive backplate for said surface, means for generating a plurality of beams of electrons within said envelope, and means for directing said plurality of electron beams, simultaneously, upon said electron opaque insulating surface.

4. A storage device comprising an evacuated envelope containing a storage electrode comprising a plane surface consisting only of an insulating material which is opaque to electrons and a conductive backplate for said surface, and a plurality of electron guns mounted to project their electrons on the exposed side of said insulating surface.

5. The invention as set forth in claim 4 and wherein the axis of one of the said electron guns is disposed at an angle of substantially 90° with respect to said insulating surface and the axis of the other of said electron guns is mounted at an acute angle with respect to said surface.

6. A storage device comprising an evacuated envelope containing a storage electrode consisting only of an insulating surface which is opaque to electrons and a conductive backplate for said surface, means for generating a plurality of beams of electrons within said envelope, means for directing said electron beams upon said electron-opaque insulating surface with sufficient velocity to cause the emission of secondary-electrons therefrom, and means for collecting said secondary-electrons.

7. The invention as set forth in claim 6 and wherein said collecting means comprises a pair of metal plates mounted in spaced parallel array on opposite sides of the path of one of said beams and out of the path of the other of said beams.

8. An electron discharge device comprising an evacuated envelope containing an electron gun, a target consisting only of an insulating surface mounted in a plane substantially normal to the axis of said gun and upon which primary-electrons from said gun are adapted to impinge with a velocity calculated to release not more than one secondary-electron for each impinging primary-electron, a second electron gun mounted along an axis which forms an acute angle with said target surface and adapted to project a second stream of primary-electrons upon said target surface with a velocity and at an angle calculated to release more than one secondary-electron for each impinging primary-electron from said second stream, and a metal backplate for said target to which a displacement current is adapted to flow when said target surface is subjected to bombardment with primary electrons from both of said electron guns.

9. The invention as set forth in claim 8 and wherein said first mentioned electron-gun is provided with means for directing its stream of electrons across said target at a certain rate and said second mentioned electron-gun is provided with means for directing its stream of electrons across said target at a slower rate.

10. The invention as set forth in claim 8 and wherein means are provided for impressing a signal upon said first mentioned electron stream.

RICHARD L. SNYDER, JR.

REFERENCES CITED

The following references are of record in the file of this patent:

UNITED STATES PATENTS

| Number | Name | Date |
|---|---|---|
| 2,108,097 | Bedford et al. | Feb. 15, 1938 |
| 2,122,095 | Gabor | June 28, 1938 |
| 2,147,760 | Vance et al. | Feb. 21, 1939 |
| 2,156,392 | Iams | May 2, 1939 |
| 2,264,540 | Lubszynski | Dec. 2, 1941 |
| 2,280,191 | Hergenrother | Apr. 21, 1942 |
| 2,324,534 | Pierce | July 20, 1943 |
| 2,339,662 | Teal | Jan. 18, 1944 |
| 2,366,319 | Donal, Jr. | Jan. 2, 1945 |

FOREIGN PATENTS

| Number | Country | Date |
|---|---|---|
| 481,170 | Great Britain | Mar. 7, 1938 |